United States Patent

[11] 3,563,476

[72] Inventor Harlan J. Donelson, Jr.
 West Highway 330, Marshalltown, Iowa 50158
[21] Appl. No. 762,715
[22] Filed Sept. 26, 1968
[45] Patented Feb. 16, 1971

[54] GRAIN BAFFLE MEANS
 10 Claims, 5 Drawing Figs.
[52] U.S. Cl.................................................. 239/668,
 239/687; 214/17.64; 98/55; 198/128
[51] Int. Cl............................................................. A01c 17/00
[50] Field of Search................................................ 239/668,
 669, 681, 687, 689; 214/17.6, 17.64; 98/55; 198/128

[56] References Cited
 UNITED STATES PATENTS
 2,961,245 11/1960 Romeiser .................. (214/17.64)UX
 3,045,840 7/1962 Donelson, Jr................ 214/17.64

FOREIGN PATENTS
234,738 6/1925 Great Britain................ 214/17.64

Primary Examiner—M. Henson Wood, Jr.
Assistant Examiner—Michael Y. Mar
Attorney—Zarley, McKee & Thomte ABSTRACT: A grain baffle means for use with a grain spreader, the grain spreader including a housing having a grain intake opening formed at the upper end thereof. A vertically movable and rotatable control plate valve means is mounted in the grain spreader housing below a hopper means for controlling the flow of grain through the grain spreader. The baffle means is mounted on the upper end of the grain spreader and has an open upper end adapted to receive grain being supplied thereto by a conveyor means. The baffle means has a discharge opening provided at its lower end which is in communication with the upper end of the grain spreader. A baffle plate is mounted in the lower end of the baffle means and has a diameter less than the diameter of the lower end of the baffle means. The baffle plate is provided with a central opening through which extends the shaft supporting the control plate valve means.

PATENTED FEB 16 1971

3,563,476

INVENTOR
HARLAN J. DONELSON, JR.
BY
Zarley, McKee & Thomte
ATTORNEYS

GRAIN BAFFLE MEANS

The instant invention is designed for use with grain spreaders such as disclosed in applicant's U.S. Pat. No. 3,045,840 which issued on July 24, 1962. The grain spreader such as disclosed in said patent includes a housing having a vertically movable and rotatable control plate valve means positioned below a hopper within the housing. The control plate valve means is designed to control the rate of flow of grain through the spreader so that the grain will be evenly scattered and distributed in the storage bin. The grain spreader disclosed in said patent is generally satisfactory in operation but it has been found that the control plate valve means does not function completely perfectly when the grain is not deposited in the approximate center thereof. Additionally, the control plate valve means also has a tendency to sometimes function improperly when the conveyor dumps the grain on the control plate valve means with a high velocity. Still further, the grain spreaders such as disclosed in said patent may sometimes kick or throw the grain upwardly and outwardly from the spreader due to the action of the resistance bar arms and also due to the updrafts passing through the grain spreader.

Therefore, it is a principal object of this invention to provide a baffle means for use with grain spreaders.

A further object of this invention is to provide a baffle means for a grain spreader which cushions the flow of grain onto the control plate valve means.

A further object of this invention is to provide a baffle means for grain spreaders which straightens the flow of grain into the grain spreader.

A further object of this invention is to provide a baffle means for a grain spreader which centers the flow of grain onto the control plate valve means.

A further object of this invention is to provide a baffle means for a grain spreader adapted to prevent the grain from bridging on the control plate valve means.

A further object of this invention is to provide a baffle means for a grain spreader wherein the velocity of grain does not effect the control plate valve means.

A further object of this invention is to provide a baffle means for a grain spreader which prevents the grain from being kicked or thrown upwardly out of the grain spreader.

A further object of this invention is to provide a baffle means for a grain spreader which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 4:
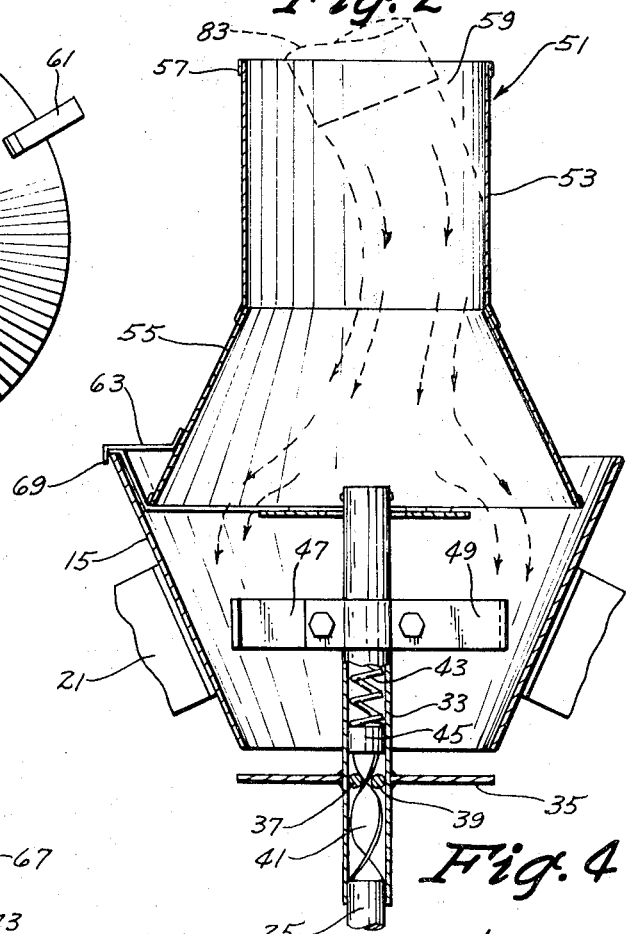
FIG. 4 is a sectional view as seen along lines 4—4 of FIG. 3, the grain spreader being shown in fragmentary form.

The numeral 10 generally designates a storage bin having an open upper end 11 into which a grain spreader 13 is mounted. Grain spreader 13 is of the type disclosed in U.S. Pat. No. 3,045,840 and includes an upwardly flared tubular member 15 having spaced apart hook arms 17 secured to the upper end thereof which engages the upper end of the storage bin 10 to support the grain spreader 13 in the opening 11. The numeral 19 designates a funnel-shaped material receiving-hopper vertically adjustably secured in the upper end portion of the tubular member 15. The diameter of the lower portion of the hopper 19 is much less than that of the diameter of the tubular member 15 and it is held in spaced relationship to the tubular member 15 by brackets 21. The numeral 23 designates a vertical tube housing open at both ends, and having a diameter less than that of the diameter of the opening 11 of the storage bin. The numeral 25 designates a vertically rotatable mounted shaft suitably mounted in the grain spreader 13 and having a grain scattering wheel 27 secured to the lower end thereof. An endless belt 29 embraces the periphery of wheel 27 and is driven by an electric motor 31. Slidably mounted on the upper end of shaft 25 is an elongated hollow member 33 as best illustrated in FIG. 4. An elongated member 33 extends upwardly within the center area of the hopper 15 and has a horizontal control plate 35 secured thereto adjacent its lower end by welding or the like. Plate 35 is positioned below the bottom open end of the hopper 15 as shown in FIG. 4. The numerals 37 and 39 designate two parallel spaced apart parts extending through the elongated member 33 and engaging each side respectively of the auger portion 41 formed on the upper end of the shaft 25 (FIG. 4). By this arrangement of parts, any relative rotation between the elongated member 33 and shaft 25 will cause the plate 35 to either move downwardly or upwardly depending upon the direction of its relative rotation to the shaft 25. Normally, however, the elongated member 33 will be held in an elevated position as shown in FIG. 4 by coiled spring 43 inside the upper end portion of the elongated member 33 and having its upper end operatively connected to the elongated member 33 and its lower end yieldingly engaging the top head 45 of the shaft 25. The elongated member 33 supports two vertically adjustable material engaging resistance bar arms 47 and 49. The grain spreader 13 operates in the manner described in U.S. Pat. No. 3,045,840 and will not be described again herein.

Figure 1:
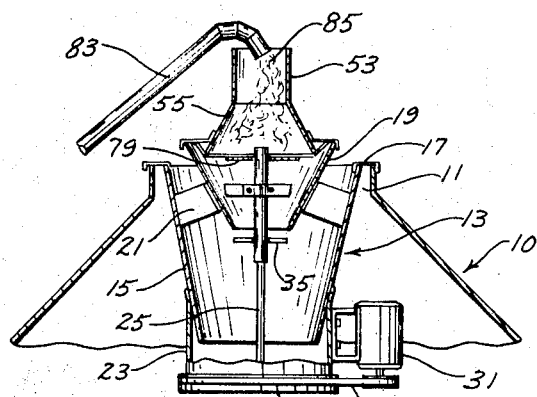
FIG. 1 is a fragmentary sectional view of the baffle means mounted on a grain spreader, the grain spreader being mounted on a grain spreader, the grain spreader being mounted in the upper end of a storage bin.
Figure 2:
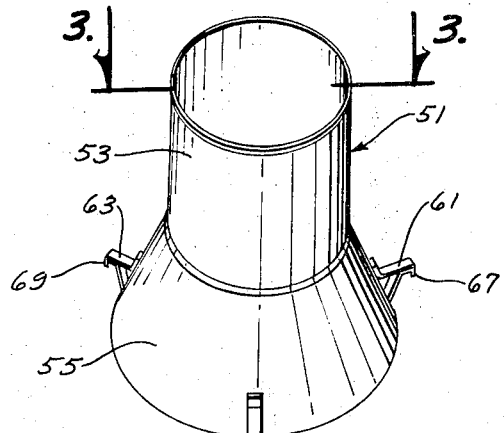
FIG. 2 is a top perspective view of the baffle means.
Figure 3:
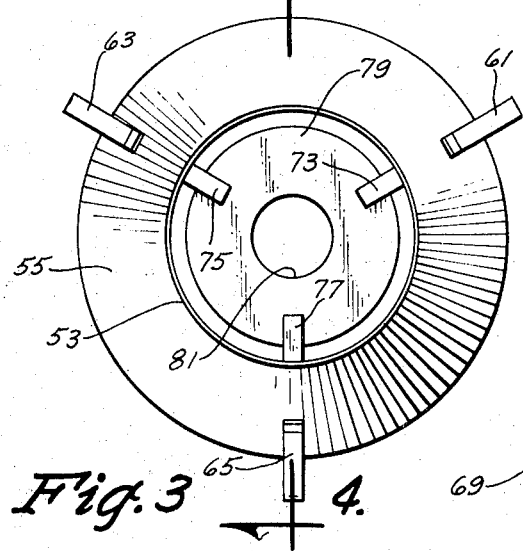
FIG. 3 is an enlarged top view as seen along lines 3—3 of FIG. 2.
Figure 5:
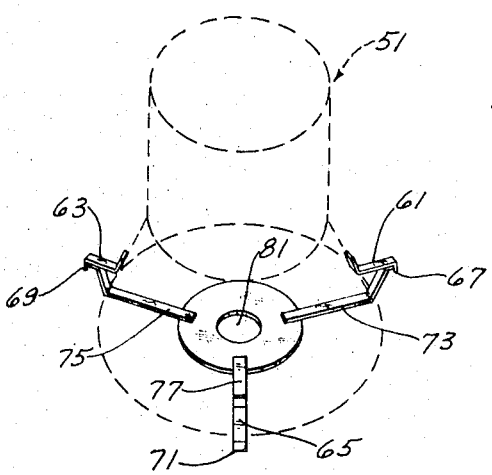
FIG. 5 is a perspective view of the mounting bracket and baffle plate at the lower end of the baffle means.

The baffle means of this invention is generally designated by the reference numeral 51 and includes a cylindrical portion 53 having a frustoconical-shaped member 55 secured to the lower end thereof and extending downwardly and outwardly therefrom as seen in FIG. 4. Cylindrical portion 53 and member 55 are secured in any convenient fashion such as welding, rivets or the like. Cylindrical portion 53 is provided with a reinforcing ring 57 extending around its open upper end 59 as seen in FIG. 4. The numerals 61, 63 and 65 designate hook brackets which are secured to member 55 adjacent the lower end thereof by any convenient means and which can be seen to extend outwardly therefrom as best illustrated in FIG. 4. The brackets 61, 63 and 65 are provided with downwardly extending hooks 67, 69 and 71 respectively which are adapted to extend over the upper end of the hopper 15 as also illustrated in FIG. 4. Supporting arms 73, 75 and 77 are secured to the brackets 61, 63 and 65 respectively and extend downwardly and inwardly therefrom as best illustrated in FIG. 5. A baffle plate 79 is secured to the inner end of supporting arms 73, 75 and 77 and is centrally positioned at the lower end of the member 55. As seen in FIG. 4, baffle plate 79 has a diameter which is less than the diameter of the lower end of member 55 and also has a diameter which is less than the diameter of the cylindrical portion 53. Plate 79 is provided with a central opening 81 which is adapted to receive the upper end of the elongated member 33 when the baffle means is mounted over the upper end of the hopper 15 of the grain spreader 13 as illustrated in FIGS. 1 and 4. The numeral 83 generally designates a suitable conveyor means adapted to supply grain 85 to the upper end of the baffle means 51 when the baffle means is positioned over the upper end of the grain spreader as illustrated in FIG. 1.

In operation, the baffle means 51 would be mounted on the upper end of the hopper 15 of the grain spreader 13 as illustrated in FIGS. 1 and 4. The grain spreader 13 would be activated and would operate in the manner discussed in U.S. Pat. No. 3,045,840. The conveyor means 83 would be activated to cause the grain 85 to be discharged into the upper end of the cylindrical portion 53 of the baffle means 51. The cylindrical portion 53 of the baffle means 51 deflects, cushions and straightens the flow of the grain 85 while the frustoconical member 55 allows freedom of movement of the grain after the grain has been deflected, cushioned and straightened by the more restricted portion 53. A portion of the grain passing through the baffle means 51 also engages the baffle plate 79 thereby aids in cushioning and straightening the fall of the grain from the conveyor means 83 and hence protects the control plate valve 35. The upper end of the elongated member 33 by extending through the opening 81 in the baffle plate 79 agitates any collection of grain on the baffle plate and prevents the grain from bridging thereon. The baffle means 51 uniformly distributes the grain around the inner periphery of the hopper 15 to insure that the control plate valve and its associated structure will function properly in an efficient manner. Additionally, the baffle means helps to prevent the normal updraft of air and the elements 47 and 49 from kicking or throwing grain upwardly out of the hopper 15.

Thus from the foregoing it can be seen that a unique baffle means has been provided for use with a grain spreader which cushions, straightens and centers the grain being discharged into the grain spreader by the conveyor means 83. The cylindrical portion 53, member 55 and baffle plate 79 cooperate to regulate the flow of grain therethrough so that the control plate 35 and its associated structure will function in an efficient manner. Preferably, the grain baffle means 51 is formed of a galvanized steel material or the like. Thus it can be seen that the device accomplishes at least all of its stated objectives.

Some changes may be made in the construction and arrangement of my grain baffle means without departing from the real spirit and purpose of my invention, and it is my intention to cover by my claims, any modified forms of structure or use of mechanical equivalents which may be reasonably included within their scope.

I claim:

1. In combination:
  a grain spreader means having a grain intake opening at its upper end;
  a grain baffle means positioned above said grain spreader means, said grain baffle means having an open upper end adapted to receive grain being discharged thereinto, said baffle means having a lower discharge end in communication with the grain intake opening of said grain spreader;
  said baffle means including means adapted to control the flow of grain passing therethrough;
  said grain baffle means including an upper cylindrical portion having upper and lower ends and a frustoconical-shaped member extending downwardly and outwardly from the lower end of said cylindrical portion; and
  a disc-shaped baffle element centrally mounted at the lower end of said frustoconical-shaped member, said baffle element having a diameter which is less than the diameter of the lower end of said frustoconical-shaped member.

2. The combination of claim 1 wherein said baffle element has a diameter less than the diameter of said cylindrical portion.

3. The combination of claim 1 wherein said grain spreader means includes a housing having a hopper means mounted therein which is positioned over a grain flow control valve means, the lower end of said frustoconical-shaped member being received by the upper end of said hopper means.

4. The combination of claim 3 wherein said valve means includes a vertically disposed rotatable shaft extending centrally upwardly into said hopper means, said baffle element having a central opening formed therein through which said rotatable shaft extends.

5. In a baffle means for a grain spreader, including:
  a hollow cylindrical portion having upper and lower ends;
  a hollow frustoconical-shaped portion extending downwardly and outwardly from the lower end of said cylindrical portion;
  and a substantially flat, circular disc-shaped baffle element fixedly and centrally mounted in said frustoconical-shaped portion at the lower end thereof.

6. The baffle means of claim 5 wherein said baffle element has a diameter less than the diameter of the lower end of said frustoconical-shaped portion.

7. The baffle means of claim 6 wherein said baffle element has a diameter less than the diameter of said cylindrical portion.

8. The baffle means of claim 5 wherein said baffle element has a central opening formed therein.

9. The baffle means of claim 6 wherein said baffle element is secured to said frustoconical-shaped member by a plurality of arm members extending inwardly from the lower end of said frustoconical-shaped member, said arm members also having supporting hook means extending outwardly from said frustoconical-shaped member.

10. In combination:
  a grain spreader means having a grain intake opening at its upper end, said grain spreader means including a housing having a hopper means mounted therein which is positioned over a grain flow control valve means;
  a stationary grain baffle means positioned above said valve means, said grain baffle means having an open upper end adapted to receive grain being discharged thereinto, said baffle means having a lower discharge end in communication with said hopper means; and
  said baffle means including means adapted to control the flow of grain passing therethrough into said hopper means.